No. 608,394. Patented Aug. 2, 1898.
J. H. MOSS.
PROCESS OF GENERATING GAS FROM KEROSENE, &c., BY MEANS OF WICKS.
(Application filed Oct. 12, 1897.)
(No Model.) 2 Sheets—Sheet 1.
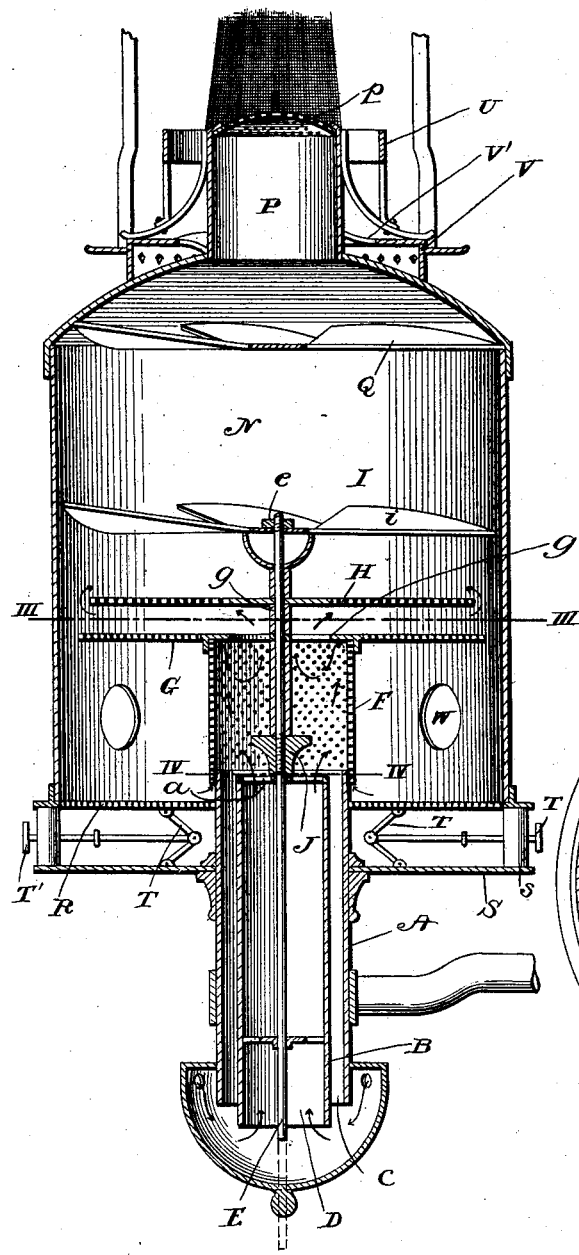
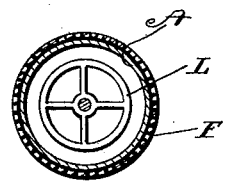
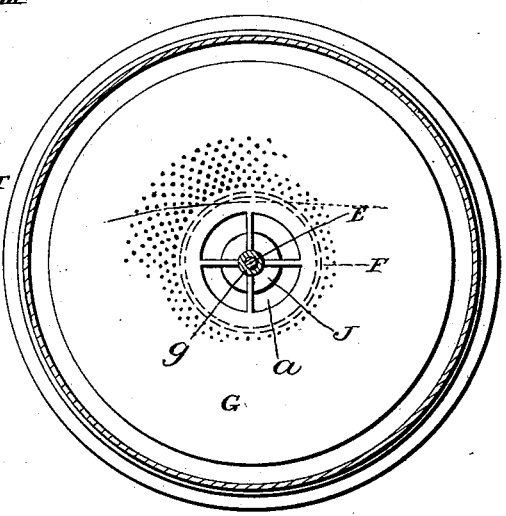

No. 608,394. Patented Aug. 2, 1898.
J. H. MOSS.
PROCESS OF GENERATING GAS FROM KEROSENE, &c., BY MEANS OF WICKS.
(Application filed Oct. 12, 1897.)
(No Model.) 2 Sheets—Sheet 2.

Witnesses:
Edw. Q. Duvall Jr.
Chas. E. Riordan

Inventor:
Jasper H. Moss
By Julian C. Dowell
His Attorney.

THE NORRIS PETERS CO., PHOTO-LITHO., WASHINGTON, D. C.

UNITED STATES PATENT OFFICE.

JASPER H. MOSS, OF TOPEKA, KANSAS, ASSIGNOR OF FORTY-NINE ONE-HUNDREDTHS TO CHANNING J. BROWN, OF SAME PLACE.

PROCESS OF GENERATING GAS FROM KEROSENE, &c., BY MEANS OF WICKS.

SPECIFICATION forming part of Letters Patent No. 608,394, dated August 2, 1898.

Application filed October 12, 1897. Serial No. 655,004. (No model.)

*To all whom it may concern:*

Be it known that I, JASPER H. MOSS, a citizen of the United States, residing at the city of Topeka, in the county of Shawnee and State of Kansas, have invented a new and useful Process for the Generation of Gas from Kerosene or other Hydrocarbon Oils by Means of Wicks; and I do hereby declare that the following is a full, clear, and exact description of the same.

The primary object of my invention is to provide efficient means for vaporizing kerosene and other hydrocarbon oils and for burning the same so as to produce an incandescent light.

Further objects are to provide a simple and efficient means for regulating the flame and increasing the efficiency of lamps of this character.

The invention will first be described with reference to the accompanying drawings, which form a part of this specification, and then pointed out in the claims at the end of the description.

Figure 2:
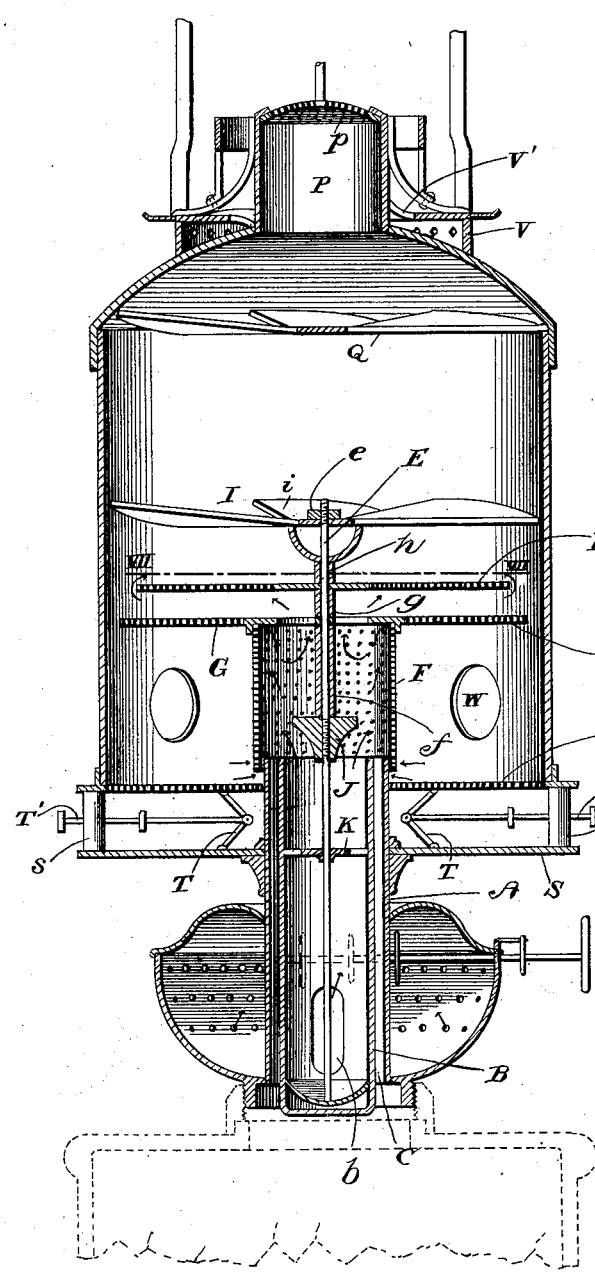
Figure 5:
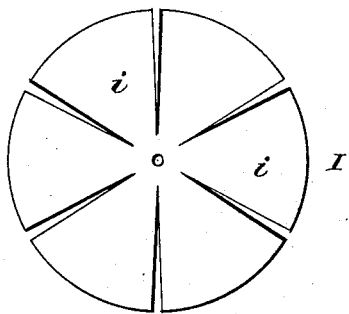
Figure 6:
Figure 7:
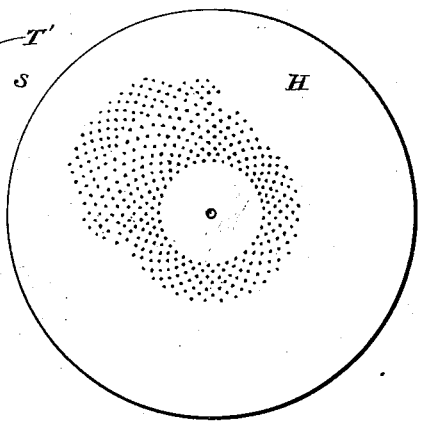

In the drawings, Figure 1 represents a vertical sectional elevation of an apparatus embodying my invention as applied to an ordinary student-lamp. Fig. 2 is a similar vertical sectional elevation of an apparatus embodying my invention as applied to an ordinary lamp having a metal or glass bowl or reservoir for the oil. Fig. 3 is a transverse section on the line III III of Fig. 1. Fig. 4 is a detail sectional view through the upper part of the post of the lamp and the lower part of the vapor-generating chamber, the section being taken on the line IV IV of Fig. 1. Fig. 5 is a top or plan view of one of the flanged metal wheels or fan-wheels for mixing and producing a whirling motion of the vapor and air. Fig. 6 is a plan of the gas spreader and mixer shown in Figs. 1 and 2, and Fig. 7 is a detail top or plan view of the air spreader and guide fitted in the air-tube of the lamp shown in Fig. 2.

Referring to the drawings, in which similar letters of reference are used to denote similar parts in different views, A denotes the outside casing of the post of the receptacle used for holding the oil; B, the inside casing; C, the wick-case, through which the oil passes to the point of ignition; D, the inside air-conduit, through which the air passes through the post; E, the rod passing through such conduit and carrying the generator, spreaders, and flanged wheel or wheels in the mixing and purifying chamber.

F represents the gas-generating chamber, surrounding the post of the lamp and extending above and below the top of the same, at the bottom of which is a flange or perforated continuation thereof acting as a guide on the post and having perforations in such flange, through which a small quantity of air is admitted. On the top of the generating-chamber and attached to it in any convenient manner or by a flange is the air-spreader G, (shown more clearly in Fig. 7,) whereby the said generator and such spreader are affixed to the rod E.

H is a metal gas-spreader resting immediately above the air-spreader G. The distance between these two spreaders regulates to a large extent the volume of gas generated. If this opening is made too large, the flame at the wick burns with an angry yellow blaze, producing much soot, and is liable to ignite the gas escaping into the mixing and purifying chamber. If made too small, the flame at the wick is extinguished. The flanged metal wheel or fan-wheel I (which is shown detached in Fig. 5) may be formed with three or more wings, beaters, or flanges *i i* by slitting a circular disk or plate, as shown, and bending or twisting the parts *i* so as to form the desired number of wings, by means of which the gas and air passing at this point when such wings or flanges are properly adjusted is pulled through such flanges with a strong whirling motion, mixing the gas and air and creating a strong suction of both air and gas on the outside edges of the spreaders G and H and causing the flame inside the gas-generating chamber F to burn firmly and steadily. This mixer is secured to the rod E, resting on the top of a cup-shaped collar, by means of a nut. The opening or closing of the wings or flanges of such wheel is thereby regulated by the tension of the nut on the rod E.

J represents a spreader at the top of the post A and is secured firmly to the rod E by means of a thread or other convenient manner. This spreader J is preferably of the conical form shown, so as to deflect the air toward or against the inner walls of the vapor-generating chamber F.

The two upper spreaders and the flange-wheel described are held in place by collars or sleeves $f\ g\ h$, surrounding the rod E and having a bearing on the top of the spreader J. Therefore when the nut $e$ on the top of the flange-wheel I is set in place the spreaders G, H, and J and the gas-generating chamber F are firmly fastened together and the whole may be readily raised or lowered on the post of the lamp by means of guides and the rod E when said rod is extended through the bottom of the post, as indicated in dotted lines in Fig. 1, to adapt it to be manipulated by hand, permitting the ready lighting of the wick at the top of the post A after the false bottom R has been raised by the toggles and levers or push-rods T T'. However, in case the spreaders and generating-chamber are not first raised by manipulating the rod E they may be raised when the false bottom is raised by contact of the inner portion thereof with the lower end of the generating-chamber.

K represents a guide for the rod E inside the central air-conduit D.

L, Figs. 1 and 4, represents a cap covering the top of the conduit D, on which rests the spreader J.

N represents the mixing and purifying chamber.

P is a cylindrical opening at the top of the chamber N, closed by a wire screen $p$, at which point the mixed gas and air is ignited.

Q is a flanged metal wheel or fan-wheel which may be of the same construction as the fan-wheel I and may entirely cover the top of the chamber N and rest on the sides thereof.

R is a perforated movable bottom surrounding the post A inside the chamber N, admitting air to such chamber.

S is a solid bottom of the chamber N, having a bearing on the post A strong enough to firmly hold the said chamber in position, to which chamber such bottom is attached by means of four or more posts $s$ at the outer edge, as shown. This solid bottom is used for the purpose of gently heating the air before passing into said chamber above and as a guard against drafts, protecting the blaze at the posts of the lamp.

T T are hinged levers or toggle-links attached to the bottoms R and S, whereby the perforated bottom R is raised or lowered. The toggles T T may be operated by a push-rod T''.

U is a metal ring surrounding the opening P, resting on three or more legs affixed to the chimney support or base V for holding a glass chimney. Air is admitted to this chimney-support through the perforations, as shown, above which openings is affixed a metal flange-wheel V' similar to the flange-wheel I, so as to permit air to pass upward to the principal flame or burner and to impart a rotary or whirling motion thereto, surrounding the opening P. The chimney support or base V is constructed so as to admit of being readily removed.

W W are openings in the chamber N, covered by a glass or mica ring to facilitate a view of the post of the lamp in the lighting of the same.

I use the mechanism illustrated in the accompanying drawings, admitting air to the inside of the generating-chamber F by means of the central air-conduit D in the post of the lamp or receptacle used for holding the oil, as preferable only, as other forms may be employed such as will readily suggest themselves to those skilled in the art, and wicks of various kinds may be used without departing from the spirit of my invention, and all air used in mixing and purifying the gas may be admitted on the outside of the post of the lamp or receptacle, both for the generating and the mixing and purifying chambers, as will hereinafter appear.

In the process of generating gas illustrated in the accompanying drawings I use the perforated gas-generating chamber as preferable only, as by surrounding the post of the lamp with a chamber constructed similar to the one shown having solid sides and a flanged perforated bottom gas may be readily generated, but not with as small a degree of heat as with a perforated chamber and with which perforated chamber the post is maintained at a cooler temperature.

In the process of generating gas illustrated the gas is produced by forcing the wick, after it is ignited, up into the generating-chamber F until the flame is made to burn with a deep violet or blue color on the inside of the wick only and is entirely extinguished for lack of air on the outside of the wick. The flame then consumes all soot and produces a large quantity of gas or vapor that is unconsumed for lack of air, which passes unignited through the opening in the top of the generating-chamber into the mixing and purifying chambers and from thence through the opening in the top of said last-mentioned chamber to the burners, where it is utilized.

In the mechanism illustrated the flanged bottom or extension of the gas-generating chamber F is perforated to allow a small quantity of air to be admitted on the outside of the post of the lamp, enough only to permit a flame to burn on the outside of the wick with a blue color when the wick is only partially raised for generating vapor. This is done for the purpose of burning up any products that may have accumulated on the side of the generating-chamber before the wick has been turned high enough to burn with a blue flame on the inside thereof.

In the process of generating gas illustrated I use the perforated movable bottoms of the mixing and purifying chamber for admitting air to such chamber as most convenient for use only in the class and size of lamp illustrated, as when said chamber is made smaller in diameter or shorter air may be admitted with better results by means of a flanged wheel or slitted plate having a series of wings similar to the fan-wheel shown in Fig. 5 surrounding the post of the lamp at such point, or air may be admitted to such chamber by an air-shutter at such point.

In the mechanism illustrated the post A may be connected with the oil-reservoir and the wick raised or lowered by any convenient method, as is manifest.

In the mechanism illustrated the amount of air supplied to the air-conduit D may be regulated by any suitable device at the bottom of such conduit or in the side thereof, arranged according to the construction of the oil-reservoir, as is manifest.

In the use of the mechanism illustrated a proper incandescent mantle may be used over the opening P, as indicated in dotted lines in Fig. 1, and may be attached by means of a thumb-screw (not shown) or other convenient manner. When the toggle-links T, which are pivotally connected with the bottom plate S and movable bottom R, and also with the push-rod T', are pulled out full, this lifts said bottom on the post A until it strikes the bottom of the gas-generating chamber F, when the whole rises together until the top of the post A is exposed. The wick is then lighted through the openings between the posts of the bottom S and the chamber N. The rods are then shoved in, and thereby the bottom R. The generating-chamber F, with attached appliances, are settled in place. Unconsumed gas or vapor is immediately formed that passes through the opening of such generating-chamber into the mixing and purifying chamber N. It is then caught by the flanged wheel I and a whirling motion induced in the gas and air throughout the chamber N. The mixed gas and air is now caught up by the second flanged wheel Q and its motion intensified. As the mixed gas and air passes up the chimney it is lighted at the top thereof, when the flame immediately strikes on the screen of the opening P and the whirling of the mixed gas and air in the chamber N is still further intensified. This creates a partial vacuum in said chamber N and a strong suction at the bottom thereof and on the edges of said spreaders, producing inside such chamber N a miniature whirlwind or cyclone, inducing an intense steady, though low or small, flame inside said gas-generating chamber F and a perfect combustion of mixed gas and air at said opening P, whereby a dazzling brilliancy is secured by said incandescent mantle. The intensity and power of such flame at this point P are increased or diminished by the size of the post A, the diameter and height of the chamber N, the number of flange-wheels and spreaders, the distance between the same, the number of openings in such flange-wheel, and the distance such flanges or wings of the flanged wheel are spread. The strength of the flame at the opening P is still further increased by the heat of the metal ring U, surrounding such opening on the outside of such incandescent mantle, and the whirling motion of the air induced by the flanged wheel or plate V' in the chimney support or base. When such mechanism is used for the purposes of heat only, such mixing-chamber N is made much longer, sufficient to act both as a chimney for the gas-generating chamber F and as a mixing-chamber, and said opening P is made large enough to produce a steady combustion at both points. It is manifest that said perforated bottom R may be made to drop down the post of the lamp and said rod E may be made to extend through the bottom of the post, as indicated in dotted lines in Fig. 1, for the purpose of raising it, and thereby raising and lowering the gas-generating chamber and superimposed parts for lighting the wick, as hereinbefore described, and when the rod is released said parts will drop down by gravity into their normal position.

It will be observed that the air admitted through the central air tube or conduit D will be deflected by the deflecting plate or spreader J against the inner walls of the gas-generating chamber F, and thence against the circumferential flange or inwardly-projecting portion g' of the plate or cover G at the top or upper portion of the vapor-generating chamber F, so as to form an eddy at this point, which will prevent the flame at the wick from rising and protruding through the top of said chamber, so as to ignite the vapor within the vapor-mixing chamber.

In the construction shown in Fig. 2 the parts are substantially the same as described with reference to Fig. 1, except that a metal or glass bowl or reservoir for the oil is shown in dotted lines attached to the post of the lamp with the usual wick-raising devices and an opening b is formed through the central tube to admit air. An air spreader and guide K is also in this instance arranged within the central air-tube, and the open-work cap L (shown in Figs. 1 and 4) is dispensed with.

In the form shown in the drawings the size or capacity of the mixing-chamber is considerably greater than the generating-chamber; but the distance between the primary burner and the main burner as compared with vapor generators and burners such as have heretofore been proposed is short, as the means located therein in the path of the vapor for mixing the vapor and air during its passage to the main burner renders a mixing-chamber of any considerable length unnecessary and undesirable. In the form shown the length and capacity of the mixing-chamber are adapted to properly mix the vapor and air under the conditions of the generation of the gas or vapor from an ordinary wick, as now used in a central-draft lamp, by a small flame confined to the inner circumference of the wick and of great intensity and purity; but when the wick is made thinner than usual, as contemplated in practicing my invention, the flame in the generating-chamber is further decreased in size and of increased intensity and purity and the mixing-chamber is decreased in height and capacity, whereby a much more purified gas issues into the mixing-chamber.

As will be observed, distinguishing features of my invention are a distinct or independent generating-chamber inclosing a primary burner and a distinct or independent mixing-chamber for receiving the gas or vapor issuing from the generating-chamber, such mixing-chamber preferably containing means located in the path of the vapor for mixing the vapor and air, together with a main burner located at a distance from the primary burner and in communication with said mixing-chamber, provision being made for introducing air at the point of ignition in the generating-chamber, so as to maintain a low or partial combustion of the oil and generate a vapor by a small flame of great intensity, and also provision for introducing additional air above and around the point of ignition to lighten and purify the vapor before its issuance into the mixing-chamber proper, the main body of the gas or vapor generated being thus caused to issue from the generating-chamber into the mixing-chamber sufficiently cooled to prevent the too-sudden cooling and consequent condensation thereof and settling upon the sides of the mixing-chamber and in suitable condition to be further mixed with atmospheric air readily, rapidly, and perfectly and without requiring a mixing-chamber of large capacity or of great length or size.

It has heretofore been proposed to provide a heating or lighting apparatus with means for generating a vapor by using a wick or "stifling-generator" adapted to partially smother or stifle the flame at the wick; but such devices are objectionable and unsatisfactory in use for the reason that no provision is made in such smothering or stifling devices or can be made for properly admitting air and regulating the generation of the gas and its issuance into the mixing-chamber in condition to be mixed or purified with air without condensation, the oil being only partially vaporized and allowed to pass to the so-called "mixing-chamber" in such condition as to at once condense upon the sides of such chamber to a marked extent, requiring a large and impracticable mixing-chamber of great capacity or a great length of chimney above the point of final combustion to adapt such devices to be used at all, the condensation of the imperfectly-vaporized oil being also facilitated by a superabundance of air and the too sudden cooling of the vapor as it issues in a highly-heated state directly from the stifling-generator into the mixing-chamber, and as a result much of the gas generated is not consumed by the main burner, which gives rise to unpleasant odors. Furthermore, a greater quantity of oil is consumed by such devices than is necessary to produce the amount of vapor required for commingling with the air for supporting combustion at the main burner, resulting in a waste of fuel as well as the production of unpleasant odors. In such prior devices there is usually too much heat or too large a flame at the wick or point of generation of the gases, consuming too much oil and imperfectly vaporizing the oil that is not consumed or sucking up more oil than the flame under the conditions of use is capable of perfectly vaporizing or that can be used at the point of final combustion, resulting in the deleterious effects stated, whereas in my improvement, without stifling means, I provide for a small flame with intense heat, so as to consume but a small quantity of oil, induce a good draft, and completely vaporize the unconsumed oil, causing the vapor to issue into the mixing-chamber in such condition that the commingling thereof with atmospheric air to the desired extent for combustion is effected without liability to ignition or condensation in the mixing-chamber and leaving the wick-tube and oil-reservoir cool, as in the ordinary coal-oil lamp.

It will be understood, of course, that I do not confine my invention to the details of construction herein shown and described, which may be varied in many ways without departing from the spirit of my invention.

The devices for producing the whirling motion of the mixed gas and air may be varied in shape and size to correspond with the size of the wick and the generating and mixing chambers, and other means for mixing the vapor and air might be substituted for the devices shown.

Having thus fully described my invention, what I claim, and desire to secure by Letters Patent, is—

1. An apparatus for burning hydrocarbon oils, comprising a distinct generating-chamber, and a distinct mixing-chamber, a burner in the generating-chamber for partially consuming the oil and generating a vapor, means located in the mixing-chamber in the path of the vapor for mixing the vapor and air and a burner communicating with the mixing-chamber for finally burning the mixed vapor and air.

2. An apparatus for generating gas or vapor from hydrocarbon oils, comprising a wick-tube, a distinct gas or vapor generating chamber inclosing the burner end of said tube, means for admitting air to said chamber so as to sustain a low or partial combustion only of the oil at the wick and generate vapor or gas, a distinct mixing or commingling chamber, and means located in said mixing-chamber in the path of the vapor constructed to automatically effect a thorough commingling of the vapor and air during its passage through the commingling-chamber.

3. An apparatus for generating vapor from hydrocarbon oils, comprising a wick-tube, a vapor-generating chamber inclosing said tube at the burner, means for admitting air to said chamber so as to sustain a low or partial combustion only of the oil and generate vapor, a mixing or commingling chamber distinct from said generating-chamber arranged to receive the main body of vapor therefrom, means located within the commingling-chamber in the path of the vapor for automatically effecting a thorough commingling of the vapor and air during the passage thereof through said commingling-chamber, a vapor-burner communicating with said mixing-chamber, and means for preventing ignition of the vapor in the commingling-chamber whereby a principal flame is maintained remote from the vapor-generating flame for consuming said main body of vapor, substantially as described.

4. An apparatus for generating vapor from hydrocarbon oils and commingling the same with air for consumption by a principal flame, comprising a distinct generating-chamber and means for supplying air thereto so as to maintain a low or partial combustion of the oil and generate vapor, a mixing or commingling chamber arranged over said generating-chamber and distinct therefrom; the latter chamber being provided with a vapor exit and burner, and devices located in the path of the vapor passing through said commingling-chamber constructed to effect a thorough commingling of the vapor and air in passing to the burner, substantially as described.

5. A gas or vapor generator and burner comprising a wick-tube, a preliminary combustion and gas-generating chamber inclosing said wick-tube at the burner end thereof, means for admitting air to said generating-chamber so as to sustain a low or partial combustion only of the gas generated therein by the flame at the wick, a mixing or commingling chamber arranged to receive the main body of gas generated in said preliminary chamber, devices arranged within said commingling-chamber constructed to set up a rotary or whirling motion of the gases in passing through the commingling-chamber, a burner for consuming the gases passing from the latter chamber, and means for preventing ignition of the gases within the commingling-chamber; whereby the gases generated quickly pass from the generating-chamber and rush through the commingling-chamber with a rotary or whirling motion to supply the main flame of the burner and maintain a brilliant light or intense heat at that point, substantially as described.

6. An apparatus for generating gas from hydrocarbon oils and burning the same so as to produce a brilliant light or intense heat therefrom, comprising a wick-tube, a gas-generating chamber, means for admitting air to said chamber so as to sustain a low or partial combustion only of the gas generated therein by the flame at the wick, a mixing or commingling chamber arranged to receive the unconsumed gases and waste products of combustion issuing from said preliminary combustion and gas-generating chamber, and means for maintaining a principal flame for consuming the gases passing from the commingling-chamber, together with means interposed between the preliminary and main burners constructed to effect a rotary or whirling motion of the gases in their passage through the commingling-chamber; whereby the unconsumed gases are drawn off from the generating-chamber and rushed through the commingling-chamber with a rotary or whirling motion, and thoroughly commingled and pass into the principal flame where the main body of the gas is consumed, substantially as described.

7. An apparatus for generating vapor from hydrocarbon oils and commingling the same for consumption by a burner adapted to produce a brilliant light, comprising a vapor-generating chamber, a wick-tube, having its burner end inclosed in said chamber, means for feeding air to said chamber, a distinct mixing-chamber, a principal burner located over said mixing-chamber, and devices arranged in the path of the vapor between said generating-chamber and principal burner constructed to spread and thoroughly commingle the upward current of vapor and air and to produce a rotary or whirling motion thereof, so as so increase the draft and effect a more perfect combustion of the vapor and gaseous products of combustion fed to the principal flame, substantially as described.

8. In a vapor-burner a wick-tube, a vapor-generating chamber inclosing said tube at the burner end thereof, means for admitting air to said chamber, a perforated plate or diaphragm having a non-perforated portion partially closing the upper part of said chamber and projecting inwardly to arrest and deflect the current of air and vapor, and an air-spreader adjacent to the burner end of the wick-tube, together with a mixing-chamber over the generating-chamber whereby the air entering said generating-chamber is deflected against the sides and top thereof so as to form an eddy therein to prevent the flame from igniting the vapor in the mixing-chamber, substantially as described.

9. In a vapor-burner, the combination with a principal burner and a mixing-chamber for supplying commingled vapor and air thereto, of a vapor-generating chamber communicating with the mixing-chamber and a wick-tube constructed to maintain a low or partial combustion only at the wick and generate vapor, a plate or diaphragm arranged over said generating-chamber for regulating the flow of vapor and air, and deflecting the same, and a fan-wheel above said diaphragm, whereby the vapor and air are spread, commingled and given a rotary or whirling motion in passing to the principal burner so as to increase the draft and insure a perfect combustion of the inflammable gases at the principal burner, substantially as described.

10. In a vapor generator and burner, the combination with the mixing-chamber of devices located therein constructed to thoroughly mix and impart a whirling motion to the vapor and air rising therethrough, a burner over said mixing-chamber, a distinct vapor-generating chamber located within the mixing-chamber, and means for feeding air to the latter chamber in such quantity as to sustain a low or partial combustion only, while permitting the main body of vapor generated to pass into the mixing-chamber to feed the principal flame, substantially as described.

11. In a vapor generator and burner, the combination with a principal burner, of a vapor and air receiving chamber and devices located therein for mixing the vapor and air in its passage therethrough to the burner, a wick-tube, a distinct vapor-generating chamber inclosing the burner end of said wick-tube, a partition or movable bottom for the latter chamber constructed to admit air therethrough, and means for shifting said bottom and the walls of the generating-chamber to permit the wick to be lighted.

12. In combination with the mixing-chamber having a vapor-burner at its top, a distinct generating-chamber, devices interposed between said generating-chamber and burner constructed to spread and mix the vapor and air passing through the mixing-chamber and to produce a rotary or whirling motion thereof, together with a wick-tube and means for admitting sufficient air to the vapor-generating chamber to sustain a low flame or partial combustion therein and to generate vapor the main body of which is commingled with air and fed to the principal flame.

13. In a vapor generator and burner, a mixing-chamber, an annular wick-tube, a concentric air-tube, a spreader at the top of said air-tube, and a vapor-generating chamber inclosing the upper end of the wick-tube, and having an inwardly-projecting flange or cover at its upper part constructed to deflect the air and vapor passing therefrom so as to form an eddy therein to prevent the flame at the wick from igniting the vapor in the mixing-chamber.

14. In a vapor generator and burner, a vapor-generating chamber, a mixing-chamber communicating therewith, a wick-tube, an air-tube and an air spreader or deflector at the top of said air-tube; said generating-chamber having the upper part thereof formed or provided with an inwardly-projecting plate or flange constructed to deflect the air and vapor passing therefrom so as to form an eddy therein to prevent the flame at the wick from igniting the vapor in the mixing-chamber.

15. In combination with the mixing-chamber and principal burner a vapor-generating chamber, inclosed in said mixing-chamber, having its upper end partially closed and its sides perforated, a wick-tube having its burner end inclosed in said generating-chamber, a guide-rod supporting said generating-chamber, and guides for said rod, a perforated plate encircling the upper end of said wick-tube and forming a movable bottom for said mixing-chamber, and means for shifting said movable bottom and therewith said generating-chamber, to permit the wick to be lighted, substantially as described.

16. In combination with the mixing-chamber provided with a vapor exit and burner, and with devices located therein for mixing the vapor and air passing therethrough, a distinct vapor-generating chamber below said burner and mixing devices having a perforated outer wall and a partially-closed top, a perforated deflecting-diaphragm having a solid part arranged directly over said generating-chamber so as to deflect the upward current of vapor and air and aid in mixing the same, and a fan-wheel arranged over said deflector for imparting a rotary or whirling motion to the air; said generating-chamber, deflector and fan-wheel being secured to a vertically-movable rod working in suitable guides to permit said devices to be raised and lowered, and means for raising said chamber, deflector and fan-wheel together.

17. In combination with the mixing-chamber having a movable perforated bottom, and a burner, the wick-tube, the gas-generating chamber, means for sustaining the walls of said generating-chamber in the plane of the wick-tube, and a push-rod and toggle-links arranged to raise said movable bottom and thereby raise said generating-chamber to permit the wick to be lighted, substantially as described.

18. In a heating or lighting apparatus, a primary burner for generating gas from a hydrocarbon by a flame confined to the inner circumference of the wick, a distinct generating-chamber inclosing said burner, means for introducing air to maintain a low or partial combustion of the oil at the point of ignition and generate a vapor, and means for introducing additional air in such generating-chamber to lighten and purify such vapor before its issuance into the mixing-chamber proper, in combination with a mixing-chamber for receiving the vapor issuing from said generating-chamber, and a main burner located at a distance from said primary burner and communicating with the mixing-chamber for burning the mixed vapor and air.

19. The improved process of generating gas from liquid hydrocarbon and burning the same, which consists in maintaining a low or imperfect combustion at the end of a wick which supplies the liquid, thus evolving vapor, copiously commingling air with such vapor at a location distinct from that where the latter is evolved, imparting a whirling motion to the resultant gas, and conducting the same to a suitable burner, substantially as described.

JASPER H. MOSS.

Witnesses:
JOHN MACDONALD,
JACOB LEVI.